United States Patent
Pratt et al.

(10) Patent No.: US 10,275,269 B1
(45) Date of Patent: Apr. 30, 2019

(54) HYPERVISOR TO SUPPORT NESTED VIRTUALIZATION

(71) Applicant: Bromium, Inc., Cupertino, CA (US)

(72) Inventors: Ian Pratt, Cambridge (GB); James Misra McKenzie, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 322 days.

(21) Appl. No.: 15/167,853

(22) Filed: May 27, 2016

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ....... G06F 9/45558; G06F 2009/45566; G06F 2009/45562; G06F 2009/45579; G06F 2009/45583; G06F 2009/45587; G06F 2009/4557
See application file for complete search history.

(56) References Cited

U.S. PATENT DOCUMENTS

| | | | | |
|---|---|---|---|---|
| 9,798,570 | B2 * | 10/2017 | Gallant | G06F 9/45558 |
| 2007/0234357 | A1 * | 10/2007 | Grobman | G06F 9/5077 718/1 |
| 2009/0235262 | A1 * | 9/2009 | Ceze | G06F 9/52 718/102 |
| 2009/0327576 | A1 * | 12/2009 | Oshins | G06F 9/45533 711/6 |
| 2010/0115513 | A1 * | 5/2010 | Moriki | G06F 9/463 718/1 |
| 2010/0125708 | A1 * | 5/2010 | Hall | G06F 12/109 711/154 |
| 2012/0216187 | A1 * | 8/2012 | Ben-Yehuda | G06F 9/45558 718/1 |
| 2014/0229943 | A1 * | 8/2014 | Tian | G06F 9/45558 718/1 |
| 2015/0134829 | A1 * | 5/2015 | Kruglick | G06F 3/0608 709/226 |
| 2016/0085568 | A1 * | 3/2016 | Dupre | G06F 9/4812 718/1 |
| 2016/0246644 | A1 * | 8/2016 | Canton | G06F 9/4812 |
| 2017/0168865 | A1 * | 6/2017 | Swidowski | G06F 9/45558 |

\* cited by examiner

*Primary Examiner* — Emerson C Puente
*Assistant Examiner* — Zhi Chen
(74) *Attorney, Agent, or Firm* — Brokaw Patent Law PC; Christopher J. Brokaw

(57) ABSTRACT

Approaches for performing nested virtualization using a hypervisor which does not support nested virtualization. A first hypervisor is loaded upon booting a computing device. The first hypervisor instantiates a first virtual machine, exposes an emulated hardware virtualization support interface to the first virtual machine, and executes a second hypervisor, which does not support nested virtualization, within the first virtual machine. The first hypervisor provides nested virtualization support to the second hypervisor to allow the second hypervisor to execute a third hypervisor within a second virtual machine by the first hypervisor abstracting hardware virtualization support to the third hypervisor.

20 Claims, 5 Drawing Sheets

HYPERVISOR TO SUPPORT NESTED VIRTUALIZATION

FIELD OF THE INVENTION

Embodiments of the invention relate to approaches involving a hypervisor that supports nested virtualization.

BACKGROUND

Certain prior art approaches may execute some components of a host operating system in a separate isolated peer virtual machine to the virtual machine in which main host operating system resides. The purpose of doing so is to protect various security data structures from ever being accessed by the host operating system kernel lest the host operating system kernel becomes compromised. In some situations, it may be desirable to execute another hypervisor on the host operating system. When a hypervisor is executing within a virtual machine at a lower privilege than another hypervisor, then the lower priority hypervisor is said to be nested.

As is well-known, there are two types of hypervisors, conveniently named Type-1 and Type-2. A Type-1 hypervisor is considered a bare-metal hypervisor and runs directly on top of virtual or physical hardware. A Type-2 hypervisor operates as a component of an existing operating system kernel.

Some hypervisors support nested virtualization, while others do not. To illustrate one problem this poses, it will first be helpful to appreciate how nested virtualization might be performed by considering FIG. 1A, which is a block diagram illustrating a first virtualized environment according to the prior art. FIG. 1 depicts a Type-1 hypervisor 110. Hypervisor 110 executes at the highest privilege (root), and may perform virtualization tasks with the direct assistance of the underlying hardware. Hypervisor 110 may instantiate one or more virtual machines, such as virtual machine 120 and 122. In the parlance of Intel technology, virtual machines 120 and 122 may be implemented as a Virtual Machine Control Structure (VMCS).

Within each virtual machine may execute an operating system, e.g., host operating system 130 may execute in virtual machine 120. Host operating system 130 may itself comprise a Type-1 hypervisor, such as Type-2 hypervisor 140. Hypervisor 140 supports nested virtualization and consequently may instantiate one or more virtual machines, such as virtual machine 150. Within virtual machine 150 may execute operating system 160. In FIG. 1A, hypervisor 110 supports nested virtualization, thereby allowing hypervisor 140 to operate.

Now consider the case where hypervisor 110 does not support nested virtualization, as is the situation depicted in FIG. 1B, which is a block diagram illustrating a second virtualized environment according to the prior art. As depicted in FIG. 1B, if an attempt is made to load Type-2 hypervisor 140 within host operating system 130, then Type-2 hypervisor 140 would try to access the underlying hardware for virtualization support (such hardware support is known as VT-x on Intel systems). However, in the situation depicted in FIG. 1B, Type-2 hypervisor 140 will observe that the (virtual) CPU does not support certain hardware virtualization extensions (as they are currently being used by hypervisor 110), and so hypervisor 140 will be unable to function unless hypervisor 140 supports legacy fallback virtualization capabilities that do not rely upon VT-x hardware virtualization support. As a result, virtual machine 150, and by extension operating system 160, may not be able to be created/loaded by the system of FIG. 1B. Thus, the present art exhibits certain undesirable limitations and restrictions when hypervisors do not support nested virtualization.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a hypervisor that performs nested virtualization activity for another hypervisor incapable of performing nested virtualization are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

It is noted that nested virtualization itself is a well understood concept and is implemented by a number of hypervisors. However, it is observed that not all hypervisors support nested virtualization, which can result in a number of limitations and restrictions. Advantageously, embodiments of the invention overcome such limitations and restrictions by providing for a hypervisor that performs nested virtualization activity for another hypervisor incapable of performing nested virtualization.

Certain hardware, such as VT-x on Intel systems, may aid a hypervisor in the performance of nested virtualization. However, Intel/AMD x86 hardware does not support nested virtualization directly; hence, it is necessary for a hypervisor to itself support nested virtualization with the assistance of hardware capabilities. Typically, a hypervisor supports nested virtualization by "flattening" the nested virtual machines so that the hypervisor running on the physical hardware makes use of the CPUs virtualization capabilities for executing the nested hypervisor's virtual machines. In the performance of doing so, the hypervisor supporting nested virtualization configures the virtualization hardware to respect the compound result of restrictions/transformations applied by the first hypervisor and by other hypervisors involved in the hierarchy of nested virtual machines.

Figure 1A:
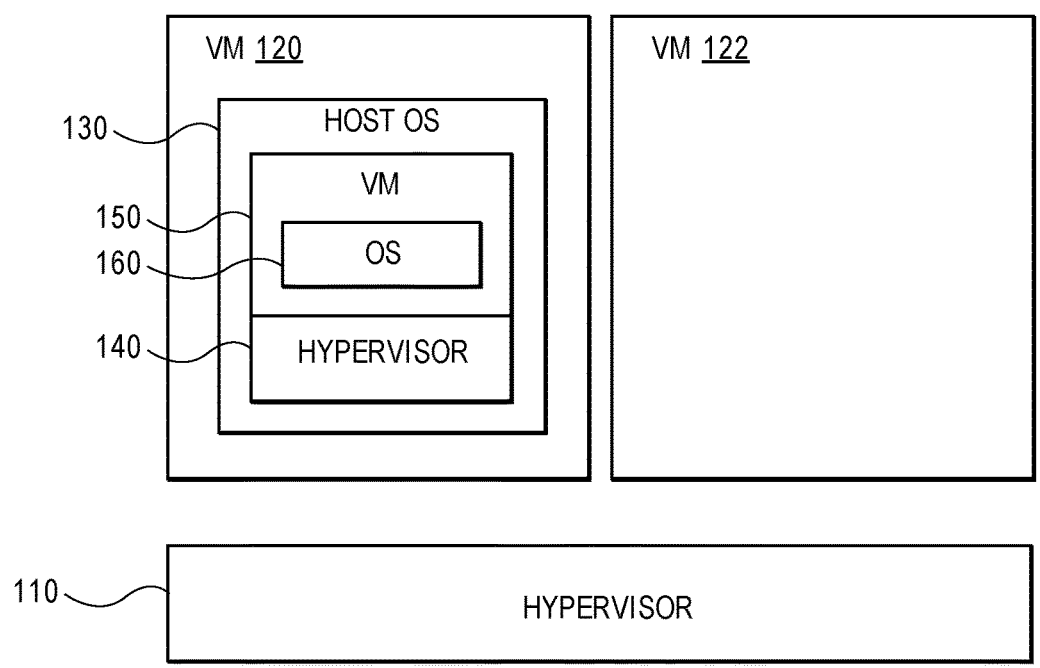
FIG. 1A a block diagram illustrating a first virtualized environment according to the prior art invention.
Figure 1B:
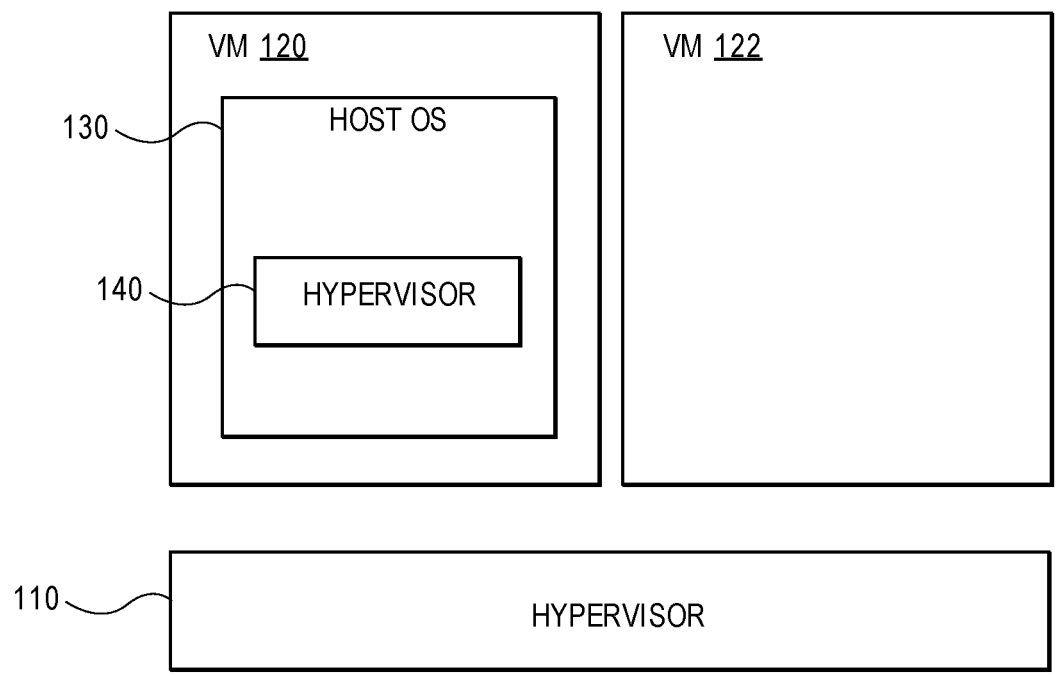
FIG. 1B a block diagram illustrating a second virtualized environment according to the prior art.
Figure 2:
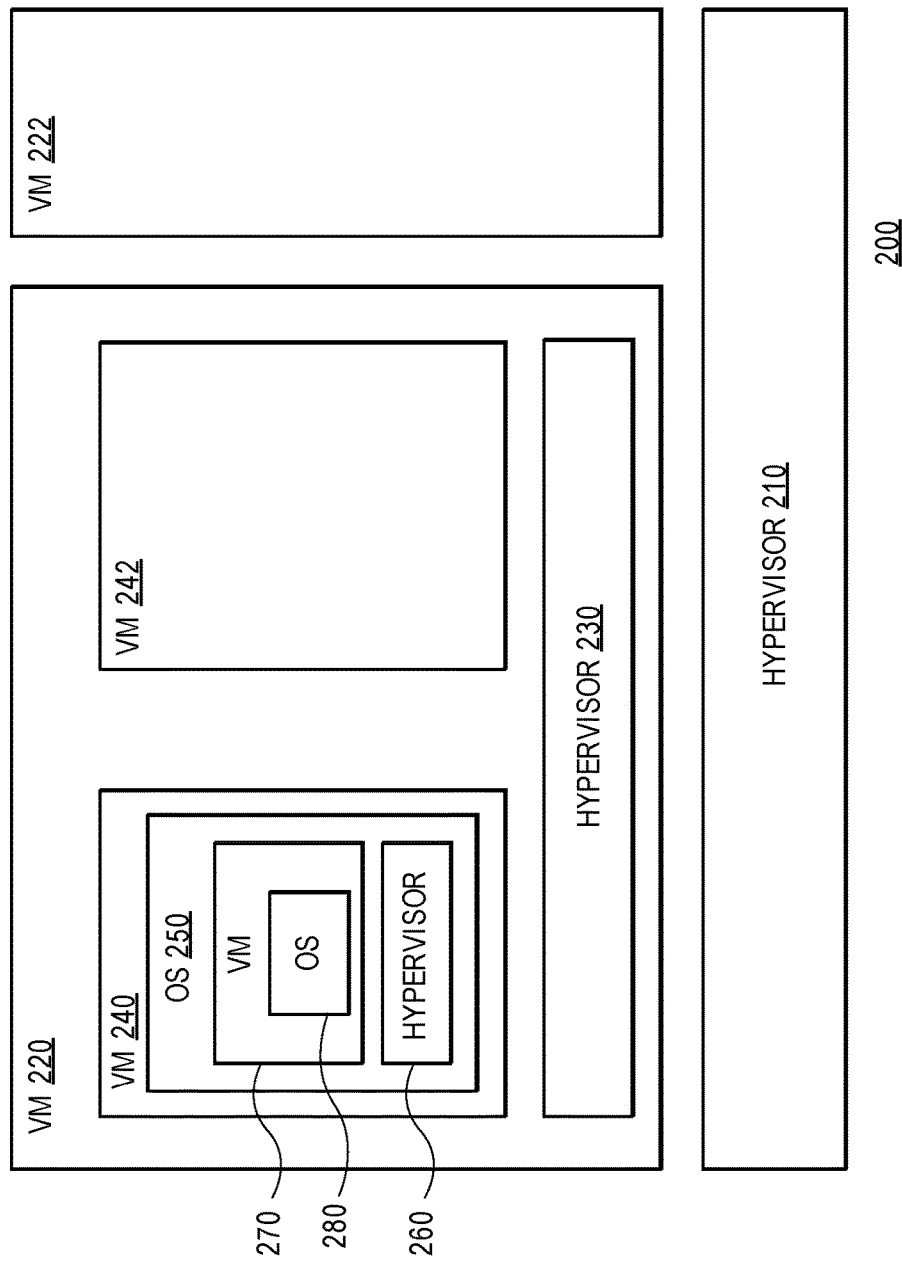
FIG. 2 is a block diagram of a virtualized environment that includes a hypervisor that performs nested virtualization activity for another hypervisor incapable of performing nested virtualization according to one embodiment of the invention.

To overcome the limitations and restrictions presented within the prior art concerning hypervisors which do not support nested virtualization, embodiments of the invention advantageously employ a hypervisor that performs nested virtualization activity for another hypervisor incapable of performing nested virtualization. FIG. 2 is a block diagram of a virtualized environment 200 that includes a hypervisor that performs nested virtualization activity for another hypervisor incapable of performing nested virtualization according to one embodiment of the invention.

Virtualized environment 200 of FIG. 2 may be implemented on any type of computer system capable of executing a hypervisor. Non-limiting, illustrative examples of a computer system upon which virtualized environment 200 may be implemented shall be described in more detail below with reference to FIG. 4.

Figure 3:
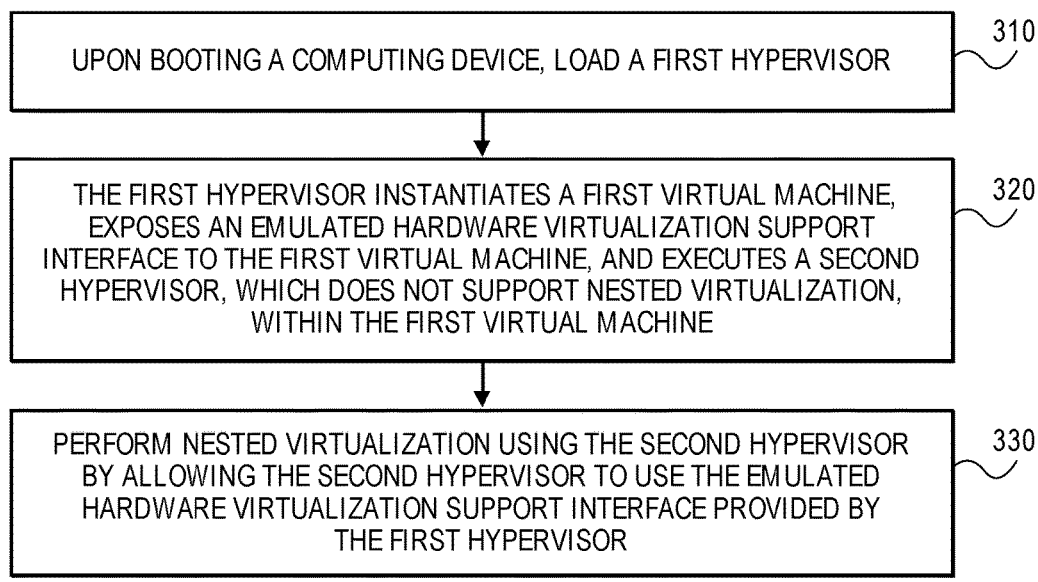
FIG. 3 is a flowchart illustrating the steps of a hypervisor performing nested virtualization activity for another hypervisor incapable of performing nested virtualization according to one embodiment of the invention.

The components of FIG. 2 shall be described with reference to FIG. 3, which is a flowchart illustrating the steps of a hypervisor performing nested virtualization activity for another hypervisor incapable of performing nested virtualization according to one embodiment of the invention.

In step 310, hypervisor 210 is loaded upon the booting of a computer system. Hypervisor 210 loads before any other hypervisor on the computer system. Hypervisor 210 may perform nested virtualization activity for other hypervisors, such as hypervisor 230. Hypervisor 230, as broadly used here, refers to any type of hypervisor which is incapable of performing or supporting nested virtualization.

Note that hypervisor 210 executes at the highest level of priority (root). Consequently, hypervisor 210 has an ability to arbitrarily manipulate the state of virtualized environment 200. After hypervisor 210 has loaded, step 320 of FIG. 3 may be performed.

In step 320, hypervisor 210 may instantiate one or more virtual machines. For example, FIG. 2 depicts virtual machines 220 and 222 as being instantiated by hypervisor 210. For purposes of providing a clear example, the activity within virtual machine 220 shall be discussed below in greater detail with reference to virtual machine 220; however, those in the art shall appreciate the activity discussed herein as being performed by hypervisor 210 relative to virtual machine 220, and the contents therein, may also be performed by hypervisor 210 relative to any other virtual machine instantiated by hypervisor 210.

In an embodiment, hypervisor 210 may thereafter load hypervisor 230 as well as an operating system within virtual machine 220. For example, if a particular operating system comprises a hypervisor (i.e., hypervisor 230) which does not support nested virtualization, hypervisor 210 may cause that operating system to be loaded within virtual machine 220 as well as load hypervisor 230.

In step 320, hypervisor 210 accesses the virtualization capabilities of the hardware (such hardware support in known as VT-x on Intel systems) to aid in the performance of nested virtualization. Hypervisor 210 exposes an interface that emulates the virtualization supported provided by the hardware; for consistency, this interface is referred to herein as the emulated hardware virtualization support interface. The emulated hardware virtualization support interface is implemented by hypervisor 210 and may be accessed by other hypervisors in the performance of nested virtualization. For example, hypervisor 210 may expose emulated hardware virtualization support interface to hypervisor 230.

In step 330, hypervisor 210 assists hypervisor 230 so that hypervisor 210 may perform nested virtualization operations on behalf of hypervisor 230. As hypervisor 210 executes at the highest privilege (root), when hypervisor 230 instantiates a virtual machine, hypervisor 210 is able to arbitrarily influence the running of those virtual machines instantiated by hypervisor 230. Hypervisor 210 is able to use this control over the virtual machines instantiated by hypervisor 230 to effectively add support for nested virtualization.

When hypervisor 230 desires to instantiate a virtual machine, hypervisor 230 will do so by requesting assistance from the emulated hardware virtualization support interface. In an embodiment, hypervisor 230 may be under the impression that when hypervisor 230 is communicating with the emulated hardware virtualization support interface, that hypervisor 230 is communicating with the physical hardware (in reality, this is not so, as hypervisor 230 is in actuality communicating with hypervisor 210 which implements the emulated hardware virtualization support interface). Such an embodiment may correspond to the situation where hypervisor 230 has not been unmodified but for by official software updates or patches provided by the manufacturer of hypervisor 230. In other embodiments, hypervisor 230 may be informed that when hypervisor 230 is communicating with the emulated hardware virtualization support interface, that hypervisor 230 is in actuality communicating with hypervisor 210. Such an embodiment may correspond to the situation where hypervisor 230 has been modified, by a party other the manufacture of hypervisor 230, as stored on disk or has been binary patched.

By issuing a request for a virtual machine using the emulated hardware virtualization support interface, hypervisor 230 may instantiate another virtual machine, such as virtual machines 240 or 242 depicted in FIG. 2. Thereafter, hypervisor 230 may load into virtual machine 240 operating system 250 using the emulated hardware virtualization support interface. Similarly, hypervisor 230 may load into virtual machine 240 hypervisor 260.

In some embodiments (such as the embodiment depicted in FIG. 2), hypervisor 260 may correspond to a Type-2 hypervisor. In other embodiments, hypervisor 260 may be a Type-1 hypervisor capable of running on bare metal (directly on physical hardware). This is made possible because hypervisor 210 exposes the emulated hardware virtualization support interface to hypervisor 260; consequently, from the perspective of hypervisor 260, it is executing on physical hardware because that is the impression which the emulated hardware virtualization support interface provides to hypervisor 260). Thus, as the emulated hardware virtualization support interface is an emulation of native hardware, hypervisor 260 may correspond to any hypervisor capable of executing on the native hardware emulated by the emulated hardware virtualization support interface implemented by hypervisor 210.

Note that hypervisor 260 expects to have the benefit of CPU support for virtualization, which hypervisor 260 would not normally possess according to the prior art, as hypervisor 230 does not support nested virtualization and hence does not expose such support to its guest virtual machines. Advantageously, according to embodiments of the invention, hypervisor 210 is able to provide such support to hypervisor 260 unbeknownst to hypervisor 230.

Communicating Vis-à-Vis a Paravirtual Driver

In other embodiments, hypervisor 260 may be aware it is running with the assistance of another hypervisor. Such an embodiment may enable hypervisor 260 to use a paravirtual interface to communicate directly with hypervisor 210. This paravirtual interface may be used by hypervisor 260 to communicate information about the CPU state in which hypervisor 260 desires to instantiate a virtual machine. Hypervisor 260 may also use the paravirtual interface to inform hypervisor 210 about a mapping between memory pages of a virtual machine that hypervisor 260 desires to instantiate (such as, for example, virtual machine 270) and the memory pages of virtual machine 240 in which hypervisor 260 executes. Either using such paravirtual interface, or using the emulated hardware virtualization support interface, hypervisor 260 may load operating system 280 into virtual machine 270 as depicted in FIG. 2.

In an embodiment, hypervisor 260 may retain a set of information to be communicated over paravirtual interface or the emulated hardware virtualization support interface in a batch fashion. In this way, hypervisor 260 may collect a batch of information to be communicated over paravirtual interface or the emulated hardware virtualization support interface; thereafter, hypervisor 260 communicate the batch of information to hypervisor 210 over virtual interface or the emulated hardware virtualization support interface. In this way, the number of transitions between hypervisor 260 and hypervisor 210 may be reduced (or more precisely, the number of transitions from hypervisor 260 to hypervisor 210 to hypervisor 230 and back again (which would be the normal path for a nested hypervisor if hypervisor 230 actually supported nested virtualization, which it does not) may be reduced).

Implementing Restrictions

In an embodiment, hypervisor 210 ensures that any restrictions applied by hypervisor 230 to the virtual machines in which hypervisor 260 instantiated are correctly implemented when handling virtual machines instantiated by hypervisor 260.

Hypervisor 210 may provide additional capabilities to the virtual machines running on hypervisor 230 which hypervisor 230 does not itself support. Similarly, hypervisor 210 may potentially expose additional capabilities through to the virtual machines running on hypervisor 260 that neither hypervisor 230 nor hypervisor 260 themselves support. As well as respecting restrictions, hypervisor 210 may augment virtual machines instantiated by either hypervisor 230 or hypervisor 260 with additional capabilities of a range of kinds, e.g. exposing hardware features or offering arbitrary software paravirtual features.

In an embodiment, hypervisor 210 will enforce whatever restrictions other hypervisors (such as hypervisors 230 and 260) in virtualized environment 200 are attempting to enforce. In addition to enforcing restrictions, hypervisor 210 will also perform translation of memory addresses, such as between guest physical addresses and machine addresses. Memory translation and mapping are some of the restrictions/transformations for nested virtual machines that hypervisor 210 must respect; to do so, hypervisor 210 may create a set of page tables that are loaded into the hardware that collapses the multiple levels of translation into one level that is implemented by the hardware. In this way, hypervisor 210 can enforce whatever restrictions and translations hypervisor 230 and hypervisor 260 are trying to enforce.

Moreover, hypervisor 210 may enforce additional restrictions that are not enforced by any other hypervisor. For example, hypervisor 210 may enforce a constraint to correct any known security issue in the operation of hypervisor 230 or 260 prior to an official update to address the known security issue being available. Hypervisor 210 may enforce other restrictions upon other hypervisors in virtualized environment 200, such as for example preventing hypervisor 230 or 260 from being able to access some device or area of memory.

Further Extensions

In an embodiment, hypervisor 210 has visibility into all activity occurring in virtualized environment 200. Hypervisor 210 may determine, based potentially on a policy of arbitrary complexity, whether to pass along responsibly for handling a particular activity to hypervisor 230, which could then pass along responsibility back to hypervisor 210, which in turn may pass responsibility back to hypervisor 260.

To elaborate this point in more detail, in any normal nested hypervisor implementation, the root hypervisor is making use of the actual virtualization hardware extensions; hence, in the embodiment of FIG. 2, execution of virtual machines 240 and 270 both take place in a VMCS created by the root hypervisor, i.e., hypervisor 210. Execution of virtual machines 240 and 270 will proceed in the corresponding VMCS until a condition occurs that requires either hypervisor 240 or 270 to service the condition. In that event, execution will then return to hypervisor 210. In the particular case of executing virtual machine 240, it is hypervisor 230 that needs to service the condition, and so hypervisor 210 will transfer execution to hypervisor 230, which may make various changes to the VMCS configuration that may require multiple emulation trips back into hypervisor 210 to emulate. In the particular case of executing virtual machine 270, the situation is even more complex as hypervisor 210 will need to return execution to hypervisor 230 which may change the VMCS state (requiring emulation trips back to hypervisor 210), and then return execution to hypervisor 260, which may make additional VMCS state changes that require emulation trips back to hypervisor 230 via hypervisor 210.

In the case of implementing nested virtualization when hypervisor 230 does not support nested virtualization, hypervisor 210 is going to service some of the exits from virtual machine 270 directly (since hypervisor 230 has no awareness of nested virtualization). This approach may be used to provide other features or capabilities to virtual machine 270 and hypervisor 260 that hypervisor 230 is not aware of or natively support. This approach may be used as a performance optimization in some cases by handling some virtual machine exits directly in hypervisor 210 rather than needing to forward up to hypervisor 230 and on to hypervisor 260, or perhaps forwarding some events directly from hypervisor 210 to hypervisor 260 bypassing hypervisor 230.

In an embodiment, for purposes of improving performance, hypervisor 210 may cause hypervisor 230 to execute at root privilege but for the occasions where for purposes of emulating virtualization support for hypervisor 260, hypervisor 210 de-privileges hypervisor 230 so that hypervisor 210 may intercept the operations it needs to provide such support. The granting of such privilege to hypervisor 230 is reasonable under most circumstances, as hypervisor 230 should be a root of trust, as the only role hypervisor 210 is intended to play is to augment hypervisor 230 with additional functionality, such as, but not limited to, the ability to perform nested virtualization.

In such an embodiment, hypervisor 230 will be executing in a VMCS rather than using the real root hardware while hypervisor 210 is performing the requested nested virtualization operations issued via the emulated hardware virtualization support interface. If hypervisor 230 is running code in hypervisor 260 or its associated virtual machine 270, then hypervisor 210 will run hypervisor 230 in a VMCS; at other times, hypervisor 210 may allow hypervisor 230 to use the root hardware, e.g., once hypervisor 210 has finished performing the requested nested virtualization operations, hypervisor 210 may cause hypervisor 230 to again execute at root privilege. It may be necessary to move hypervisor 230 out of virtual machine 220 to grant hypervisor 230 root privilege. Thus, while hypervisor 230 does not possess root privilege, hypervisor 230 will remain within virtual machine 220 so that it may execute at a lower privilege than hypervisor 210.

Hardware Mechanisms

Figure 4:
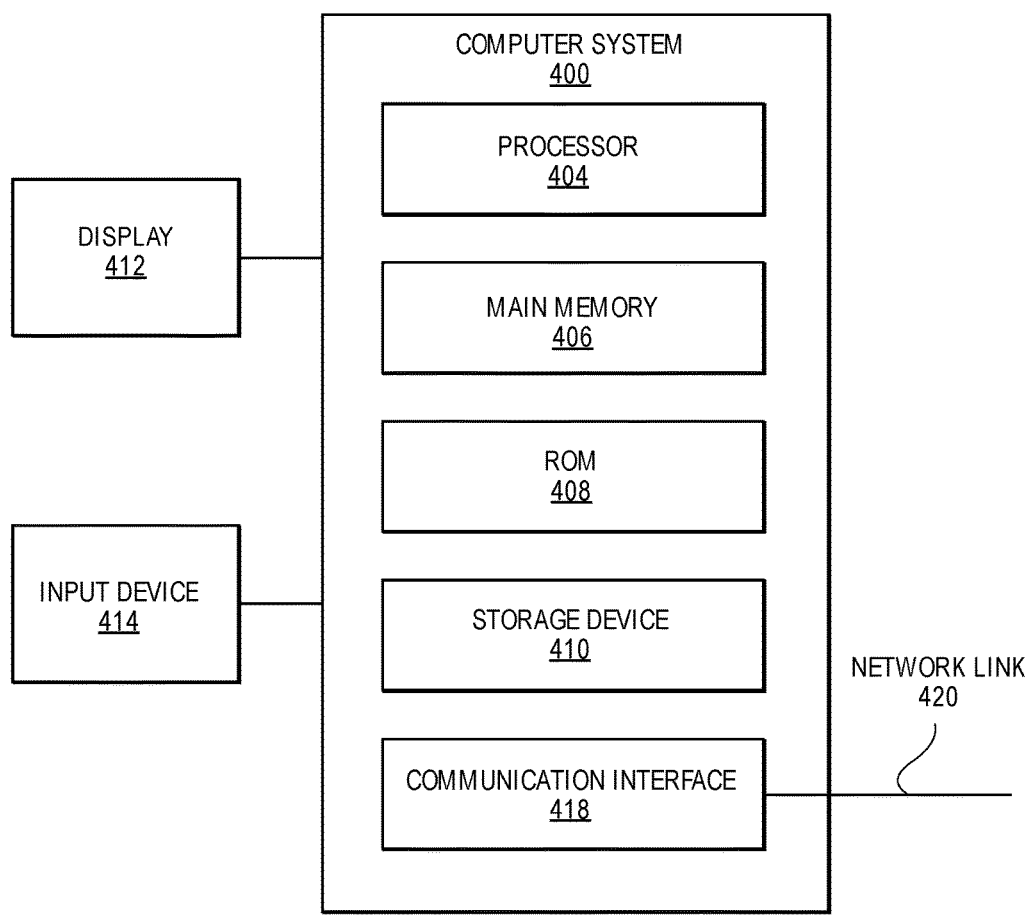
FIG. 4 is a block diagram that illustrates the hardware components of a computer system upon which an embodiment of the invention may be implemented.

Virtualized environment 200 of FIG. 2 may be implemented on any type of computer system capable of executing a hypervisor. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 404 for execution. Storage device 410 may correspond to a non-transitory machine-readable storage medium. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for performing nested virtualization, which when executed by one or more processors, causes:
   performing nested virtualization using a hypervisor which does not support nested virtualization by:

upon booting a computing device, loading a first hypervisor;

the first hypervisor (1) instantiating a first virtual machine, (2) exposing an emulated hardware virtualization support interface to the first virtual machine, and (3) executing a second hypervisor, which does not support nested virtualization, within the first virtual machine;

the first hypervisor providing nested virtualization support to the second hypervisor to allow the second hypervisor to execute a third hypervisor within a second virtual machine, wherein providing nested virtualization support comprises the first hypervisor abstracting hardware virtualization support directly to the third hypervisor using a paravirtual interface; and the first hypervisor dynamically assigning the second hypervisor root privilege when the second hypervisor is not executing the third hypervisor or any virtual machine instantiated by the third hypervisor.

2. The one or more non-transitory machine-readable storage mediums of claim 1, wherein the first hypervisor ensures a correct enactment and enforcement of constraints against any virtual machines instantiated by said third hypervisor, wherein said constraints are those constraints applied by the second hypervisor to the second virtual machine in which the third hypervisor executes.

3. The one or more non-transitory machine-readable storage mediums of claim 1, wherein the third hypervisor is an unmodified hypervisor.

4. The one or more non-transitory machine-readable storage mediums of claim 1, wherein said paravirtual interface is employed by said third hypervisor to communicate, to the first hypervisor, information about CPU state in which a particular virtual machine, either currently instantiated or requested to be instantiated by the third hypervisor, is to be executed.

5. The one or more non-transitory machine-readable storage of claim 1, wherein said paravirtual interface is employed by said third hypervisor to communicate, to the first hypervisor, information about a mapping between (a) memory pages for a virtual machine in which the third hypervisor wishes to execute and (b) memory pages belonging to the second virtual machine.

6. The one or more non-transitory machine-readable storage mediums of claim 1, wherein the second hypervisor is in an unmodified state.

7. The one or more non-transitory machine-readable storage mediums of claim 1, wherein the second hypervisor is in a modified state, relative to any manufacturer release, as stored on disk or is binary patched.

8. The one or more non-transitory machine-readable storage mediums of claim 1, wherein the first hypervisor corrects any known security issue in the operation of the second hypervisor prior to an official update to address said known security issue being available for the second hypervisor.

9. The one or more non-transitory machine-readable storage mediums of claim 1, wherein the first hypervisor ensures a correct enactment and enforcement of any constraints applied by the second hypervisor and the third hypervisor.

10. One or more non-transitory machine-readable storage mediums storing one or more sequences of instructions for providing one or more services to a hypervisor, which when executed by one or more processors, causes:

upon booting a computing device, loading a first hypervisor;

the first hypervisor (1) instantiating a first virtual machine, (2) exposing an emulated hardware virtualization support interface to the first virtual machine, and (3) executing a second hypervisor;

the second hypervisor executing a third hypervisor within a second nested virtual machine; and the first hypervisor dynamically assigning the second hypervisor root privilege when the second hypervisor is not executing the third hypervisor or any virtual machine instantiated by the third hypervisor, wherein the first hypervisor provides one or more services directly to the third hypervisor.

11. An apparatus for performing nested virtualization, comprising:

one or more processors; and one or more non-transitory computer-readable storage mediums storing one or more sequences of instructions, which when executed, cause:

performing nested virtualization using a hypervisor which does not support nested virtualization by:

upon booting a computing device, loading a first hypervisor;

the first hypervisor (1) instantiating a first virtual machine, (2) exposing an emulated hardware virtualization support interface to the first virtual machine, and (3) executing a second hypervisor, which does not support nested virtualization, within the first virtual machine;

the first hypervisor providing nested virtualization support to the second hypervisor to allow the second hypervisor to execute a third hypervisor within a second virtual machine, wherein providing nested virtualization support comprises the first hypervisor abstracting hardware virtualization support directly to the third hypervisor using a paravirtual interface;

the first hypervisor dynamically assigning the second hypervisor root privilege when the second hypervisor is not executing the third hypervisor or any virtual machine instantiated by the third hypervisor.

12. The apparatus of claim 11, wherein the first hypervisor ensures a correct enactment and enforcement of constraints against any virtual machines instantiated by said third hypervisor, wherein said constraints are those constraints applied by the second hypervisor to the second virtual machine in which the third hypervisor executes.

13. The apparatus of claim 11, wherein the third hypervisor is an unmodified hypervisor.

14. The apparatus of claim 11, wherein said paravirtual interface is employed by said third hypervisor to communicate, to the first hypervisor, information about CPU state in which a particular virtual machine, either currently instantiated or requested to be instantiated by the third hypervisor, is to be executed.

15. The apparatus of claim 11, wherein said paravirtual interface is employed by said third hypervisor to communicate, to the first hypervisor, information about a mapping between (a) memory pages for a virtual machine in which the third hypervisor wishes to execute and (b) memory pages belonging to the second virtual machine.

16. The apparatus of claim 11, wherein the second hypervisor is in an unmodified state.

17. The apparatus of claim 11, wherein the second hypervisor is in a modified state, relative to any manufacturer release, as stored on disk or is binary patched.

18. The apparatus of claim 11, wherein the first hypervisor corrects any known security issue in the operation of the second hypervisor prior to an official update to address said known security issue being available for the second hypervisor.

19. The apparatus of claim 11, wherein the first hypervisor ensures a correct enactment and enforcement of any constraints applied by the second hypervisor and the third hypervisor.

20. An apparatus for providing one or more services to a hypervisor, comprising:
   one or more processors; and
   one or more non-transitory computer-readable storage mediums storing one or more sequences of instructions, which when executed, cause:
      upon booting a computing device, loading a first hypervisor;
      the first hypervisor (1) instantiating a first virtual machine, (2) exposing an emulated hardware virtualization support interface to the first virtual machine, and (3) executing a second hypervisor; and
      the second hypervisor executing a third hypervisor within a second nested virtual machine,
      wherein the first hypervisor provides one or more services directly to the third hypervisor; and
      the first hypervisor dynamically assigning the second hypervisor root privilege when the second hypervisor is not executing the third hypervisor or any virtual machine instantiated by the third hypervisor.

* * * * *